(12) United States Patent
Walker

(10) Patent No.: US 6,285,197 B2
(45) Date of Patent: *Sep. 4, 2001

(54) SYSTEM AND METHOD FOR GENERATING A JITTERED TEST SIGNAL

(75) Inventor: Marc S. Walker, Taylorsville, UT (US)

(73) Assignee: Philips Electronics North America Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,329

(22) Filed: Jul. 31, 1998

(51) Int. Cl.$^7$ .......................... G01R 27/02; G01R 23/175
(52) U.S. Cl. ........................................ 324/603; 324/76.54
(58) Field of Search .................................... 324/603, 602, 324/605, 617, 76.52, 76.53, 76.77, 76.54, 76.35; 327/269, 231, 241

(56) References Cited

U.S. PATENT DOCUMENTS

| | | |
|---|---|---|
| 3,558,933 | 1/1971 | Meyer ...................................... 328/56 |
| 4,797,586 | 1/1989 | Traa ....................................... 307/603 |
| 5,175,454 | 12/1992 | Murakami ............................. 307/603 |
| 5,191,234 * | 3/1993 | Murakami et al. ................... 327/324 |
| 5,534,808 | 7/1996 | Takaki et al. ......................... 327/261 |
| 5,572,159 | 11/1996 | McFarland ............................ 327/276 |
| 5,777,501 | 7/1998 | Abouseido ............................ 327/274 |

\* cited by examiner

*Primary Examiner*—Safet Metjahic
*Assistant Examiner*—J Kerveros

(57) ABSTRACT

A jitter unit converts a stable input test signal into a jittering output test signal used to test the jitter tolerance of electronic equipment. This jitter device allows any test or sample signal (analog or digital, video or audio) to be used for testing such equipment. Jitter is a type of timing error between the expected or ideal timing of a signal and the actual timing of a signal in which the characteristics of the timing error change with time. The characteristics of jitter include the level of error, the frequency of change in the error and whether the change is periodic or random. The jitter unit uses a variable delay unit to delay the signal and uses a controller to regulate the delay of the delay unit in order to transform the stable signal into a jittering signal.

7 Claims, 1 Drawing Sheet

SYSTEM AND METHOD FOR GENERATING A JITTERED TEST SIGNAL

FIELD OF THE INVENTION

In common information-handling systems a signal is sent from a transmitter to a receiver. For example, a video signal, either digital or analog, is generated by a camera and transmitted to a video tape recorder. The signal is transmitted from the recorder using the tape to a video tape player. Then the video may be transmitted from the player through a cable television system to a television monitor. In another example, a disk drive may generate a digital signal that is transmitted to a port of a computer system and the computer system transmits the digital signal to another computer system through a computer network.

In many such information transmission systems, transmission errors may occur in reception due to a phenomenon referred to by those skilled in the art, as jitter. Jitter describes a particular type of dynamic timing error which occurs in the signal generation, in the transmitter, or in the transmission media. In jitter, the error is dynamic in that the level or amount of timing error varies with time. In jitter, the level of the timing error may vary randomly or periodically and the error usually varies around an ideal or correct timing. The speed or frequency with which the error varies may also change over time. In the arts of phonograph recording and playback and tape recording and playback, this jitter is sometimes referred to as wow or flutter.

Because jitter is generally undesirable in information transmission and often disabling, sophisticated information handling equipment such as transmitters and receivers often include apparatus to ameliorate or compensate for the effects of jitter so that the equipment operates correctly even when input signals include jitter. For example, a transmitter may include a system to reduce or eliminate jitter so that the transmitted signal jitters less than the input signal. A receiver may include circuitry to recognize jitter in the received signal and to modify the signal to eliminate or at least reduce the jitter or recognize signals despite jitter.

BACKGROUND

FIG. 1 shows a typical example of an existing jitter generation system 10. A jitter controller 11 is coupled to a frequency control input of a controllable oscillator 12 which provides a clock output depending on the input control signal. For example, the clock may be a voltage-controlled oscillator (VCO) which provides a clock signal at a frequency depending on an input voltage that depends on the jitter control. The result is that the clock output is phase or frequency modulated by the jitter control signal provided by the jitter control. The clock output is connected to the clock input of a test signal generator 13. Then the jitter generation system produces a test signal such as a sine wave or square wave with a frequency that deviates slightly with time depending on the voltage signal from the jitter generator.

Those skilled in the art are referred to U.S. Pat. Nos. 3,558,933 to Meyer, 4,797,586 to Traa, 5,175,454 to Murakami, 5,534,808 to Takaki, 5,572,159 to McFarland, and 5,777,501 to AbouSeido. These patents are related to digital delay lines.

The above citations are hereby incorporated herein in whole by reference.

SUMMARY OF THE INVENTION

Some test signal generation equipment does not have an input for a clock signal or does not provide stable operation when the clock signal is jittered. Most signal generators are designed and optimized to provide a stable signal, and destabilizing the clock signal to provide jittering often will not provide satisfactory jittering. The test output may become unjittered, irregular, or chaotically unstable.

When developing equipment or during production of equipment, especially digital or analog video and audio transmitters and receivers, it would be useful to test the equipment, or at least parts of the equipment, using actual signals such as sample audio or video signals that jitter. Then apparatus for reducing the effects of jitter could be developed that compensated for jitter that listeners or viewers found disturbing, rather than compensating for some theoretical wave pattern that may not even have the same effect on the equipment as an actual sample signal that is jittering. Equipment could more easily and reliably be designed and produced that operated correctly with jittering input. In the invention described herein, a test signal is produced for testing equipment. The test signal is modified by routing it through a variable delay circuit. A control signal is generated to control the variable delay circuit so that a delayed test signal jitters. The jittering test signal is used to test equipment to determine the effect of the jittering signal on the equipment.

The invention avoids the need for destabilizing the operation of the test signal generator. Existing signal generators do not have to be modified to utilize the invention since only the signal is modified after it is generated. This is possible because the invention allows separation between the initial signal generation and the jittering of the test signal. The invention also allows sample signals, such as video patterns, to easily be used as signal sources by subsequently jittering these signals for use as jittering test signal. For example a tape player can provide a stable test signal and a jitter unit can jitter the signal, and if desired, the jittering signal can be recorded and later played back to provide a jittering test signal. Depending on the design of the variable delay circuit and the type of testing required, it will be possible in some cases, to use the same delay unit for providing both jittering analog signals and jittering digital signals.

Other alternatives and advantages of applicant's inventions will be disclosed or become obvious to those skilled in the art by studying the following detailed description with reference to the following drawings which illustrate elements of the claimed inventions.

DESCRIPTION OF THE BEST MODE AND PREFERRED EMBODIMENTS

Figure 1:
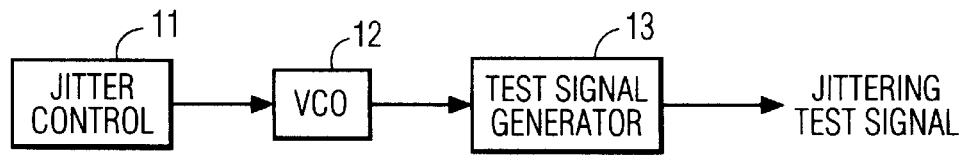
FIG. 1 is a block diagram that schematically illustrates an example of a prior art system for generating jittering signals.
Figure 2:
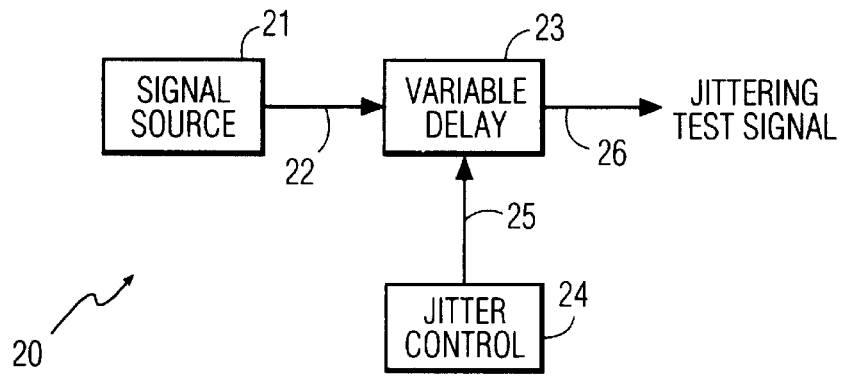
FIG. 2 is a block diagram that shows an example system of the invention for providing jittering signals.

FIG. 2 illustrates an example system 20 of the invention. A signal source 21 provides a stable non-jittering test signal. The signal may be a special test signal selected to fully test the electronic device or the signal may be a typical signal that the equipment is used for. The source may be a stable signal generator or the source may provide a sample of a signal typically used with the equipment from a signal storage device. For example, for testing a video receiver, the source may be a video tape recorder which provides a video signal. Such a video receiver may pass the received video signal to a monitor as the receiver is being tested, so that a testing technician can determine if the receiver is able to correct the jitter before passing the signal to the monitor.

The test signal is directed through a medium 22 to an input of a variable delay unit 23. Medium 22 may be an optic or electrical cable, a radio frequency broadcast, infrared or any other known media. The media may include a tape recorder and player to provide the signal at a different place or time. Variable delay unit 23 may be fabricated as a delay line having a variable signal delay or a multitude of fixed delay lines and a switch for selecting one of the fixed delay lines as described in more detail below. A voltage variable type delay line for analog signals may consist of, for example, a line with multiple series inductors, parallel voltage variable capacitors, and a voltage variable equalizer. A variable delay line for digital signals may consist of a cascade of digital elements such as logic gates, invertors, or amplifiers with the delay time adjusted by switching these elements in and out of the cascade. Fixed delay type delay lines may be simply a length of wire, for example, on a printed circuit board or a coil of coaxial cable for and electrical signal jitterer; or fiber optic cable for a signal jitterer for an optical signal. For more extended delays a fixed delay line may be, for example, a multitude of series inductive elements and parallel capacitive elements to ground. One type of fixed delay element is a coil wrapped in foil that is connected to ground. For longer delays acoustic delay devices convert an electrical signal to sound that is transmitted through air or glass and is then reconverted back into electrical signals. Instead of delay lines, digital signals (or digitally sampled analog signals) may utilize registers operated by delayed clock lines to provide a signal delay. Also, an analog signal may be digitally sampled at a high frequency, delayed in a buffer, and then converted back to analog form with any desired delay. In some cases delay may be provided by a programmed computer system through which the signal is routed. Those skilled in the art are aware of many methods for delaying signals and the specific selection of a delay method depends on the nature of the signal being delayed and the characteristics of the jittering to be applied to the signal. The specific selection may depend, for example, on whether the stable test signal is digital or analog, the frequency of the test signal, the frequency of change and level of the timing error, and the precision with which the wave form of the jittering signal has to match that of the original or underlying test signal.

A jitter control unit 24 generates a signal to control the delay of the variable delay unit. The signal represents the jitter characteristic to be tested for in terms of the frequency of the change in the delay and the level of delay or the phase difference between the test signal and the jittering signal. The jitter control signal is directed through media 25 to a delay control input of variable delay unit 23. Media 25 may be similar to media 22 described above in relation to the above stable test signal.

Characteristics of the jittering test signal that is output from the variable delay unit are dependent on the jitter control signal. That is, both the frequency of change in the delay and the level of delay or phase difference depend on the jitter control signal. The underlying signal of the jittering test signal, however, continues to be the originally generated test signal.

The jitter control unit may be a simple wave generator in which case the level of jitter may be defined by the waveform. Alternately, the generator may be a computer system that can be programmed to provide any desired jitter characteristics.

The jittering test signal is transmitted through medium 26 to electronic equipment that needs to be tested for jitter resistance. Medium 26 may be any medium as described above for medium 22.

Figure 3:
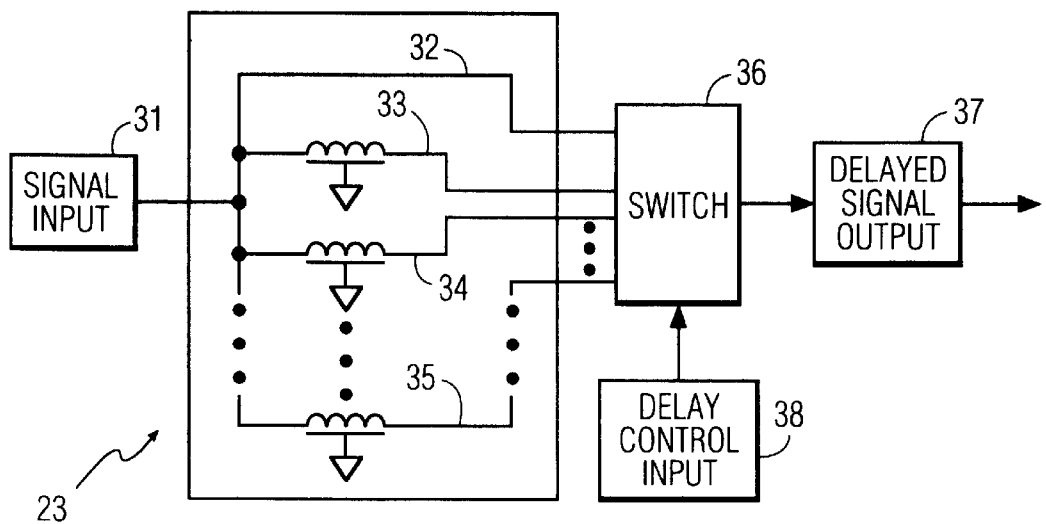
FIG. 3 schematically depicts a specific example of a variable delay unit of the system of FIG. 2.

FIG. 3 illustrate a specific example of the variable delay unit 23 shown in FIG. 2 which uses multiple fixed delay lines and a selection switch. The test signal is introduced through signal input 31 such as a cable connector. The signal is routed to the input ends of a multitude of delay lines 32–35. The number of delay lines depends on the exactness of delay and number of levels of delay required for testing the relevant electronic systems. In this specific example, one delay line may be a straight through line providing a minimum time delay. Each of the other delay lines 33–35 includes a delay element and each delay element provides a different delay. For example, the delays may increase linearly, exponentially, or sinusoidally as in 1 ms, 2 ms, 3 ms, 5 ms, 8 ms, etc. The delay line through which the signal is delivered and thus the delay, is selected using a switch unit 36 which connects only one of the delay lines to the delayed signal output 37 such as another cable connector. A delay control signal is introduced to the switch 36 through the delay control input such as a cable connector. The switch unit may be, for example, a matrix of transistors each controlled by a line of a delay control cable or the switch may include decoding to convert a few logic signal lines into a signal for a specific switch of a multitude of switches. Alternatively, if desired, a switch can be provided which is programmable. During operation the delay control signal will constantly switch connections between selected delay lines and the output. The delay line selection will constantly change in order to jitter the output signal. The jitter characteristics of the delayed output will depend on which delay lines are alternatively being connected to the output and how often the switches swap between the delay lines.

The best mode for making and using the invention has been described and the invention has been described with reference to specific embodiments with sufficient detail to enable any person skilled in the art to make and use the invention. Those skilled in the art may modify these embodiments or provide new embodiments within the spirit of the invention, and thus, the description does not limit the present invention to the disclosed embodiments. The invention is limited only by the following appended claims.

I claim:

1. A system for producing a jittering test signal, comprising:

means for delaying a signal with means to vary the delay depending on a jitter control signal;

an input for a substantially non-jittering test signal to the signal delay means;

an output for the delayed signal from the signal delay means;

an input for the delay control signal; and means for providing a jitter control signal to the delay control signal input in order to provide jittering of the test signal.

2. The system of claim 1 in which the signal delay means includes a delay circuit with an inductive element.

3. The system of claim 1 in which the delay varying means include:

a plurality of delay circuits; and switch means to direct the test signal through a selected delay circuit of the plurality of delay circuits in order to vary the delay of the test signal depending on the delay control signal.

4. A system for testing at least portions of electronic equipment, comprising means for providing a substantially non-jittering test signal;

means for providing a jitter control signal; and means for delaying the test signal by a variable amount depending on the jitter control signal to provide a jittering test signal.

5. The system of claim 4 in which the means for providing a test signal is a video signal storage and retrieval system.

6. The system of claim 4 in which the means for providing a jittering control signal is adapted to provide jittering with different frequencies of change in delay and different levels of delay.

7. A method for generating a jittering test signal, which comprises:

generating a substantially non-jittering test signal;

generating a jitter control signal;

providing said test signal to a signal input of a variable delay circuit; and providing said jitter control signal to a control input of said variable delay circuit to generate the jittering test signal at an output of said variable delay circuit.

* * * * *